(12) United States Patent
Wang et al.

(10) Patent No.: US 9,590,228 B1
(45) Date of Patent: Mar. 7, 2017

(54) THREE-DIMENSIONAL MICRO-LATTICE BATTERY STRUCTURES WITH CONVECTIVE FLOW OF ELECTROLYTES

(71) Applicant: HRL Laboratories, LLC, Malibu, CA (US)

(72) Inventors: John Wang, Los Angeles, CA (US); Tobias A. Schaedler, Oak Park, CA (US); Christopher S. Roper, Santa Monica, CA (US); Christopher P. Henry, Thousand Oaks, CA (US); Alan J. Jacobsen, Woodland Hills, CA (US); Ping Liu, Irvine, CA (US); Geoffrey P. McKnight, Los Angeles, CA (US); William Carter, Calabasas, CA (US)

(73) Assignee: HRL Laboratroies, LLC, Malibu, CA (US)

( * ) Notice: Subject to any disclaimer, the term of this patent is extended or adjusted under 35 U.S.C. 154(b) by 222 days.

(21) Appl. No.: 14/530,753

(22) Filed: Nov. 2, 2014

Related U.S. Application Data

(60) Provisional application No. 61/898,631, filed on Nov. 1, 2013.

(51) Int. Cl.
*H01M 2/36* (2006.01)
*H01M 10/613* (2014.01)
(Continued)

(52) U.S. Cl.
CPC ............ *H01M 2/362* (2013.01); *H01M 2/40* (2013.01); *H01M 10/054* (2013.01);
(Continued)

(58) Field of Classification Search
None
See application file for complete search history.

(56) References Cited

U.S. PATENT DOCUMENTS 8,148,009 B2   4/2012   Chiang et al.
8,778,552 B2   7/2014   Chiang et al.
(Continued)

*Primary Examiner* — Patrick Ryan
*Assistant Examiner* — Wyatt McConnell
(74) *Attorney, Agent, or Firm* — O'Connor & Company

(57) ABSTRACT

A new battery structure as disclosed allows convective flow of electrolyte through three-dimensional structured electrodes. Hierarchical battery structure design enables three-dimensional metal structures with fluid transport capabilities. Some variations provide a lithium-ion battery system with convective electrolyte flow, comprising: a positive electrode comprising a lithium-containing electrode material and a conductive network with hollow liquid-transport conduits; a negative electrode comprising a lithium-containing electrode material in the conductive network; a separator that electronically isolates the positive and negative electrodes; and a liquid electrolyte contained within the hollow liquid-transport conduits of the conductive network. The hollow liquid-transport conduits serve as structural members, and the walls of these conduits serve as current collectors. The conductive networks may include a micro-lattice structure with a cellular material formed of hollow tubes. Performance and thermal management of lithium-ion batteries (and other types of batteries) can be improved.

28 Claims, 8 Drawing Sheets

(51) Int. Cl.
*H01M 2/40* (2006.01)
*H01M 10/0525* (2010.01)
*H01M 10/054* (2010.01)

(52) U.S. Cl.
CPC ... *H01M 10/0525* (2013.01); *H01M 10/5004* (2013.01); *H01M 2220/20* (2013.01)

(56) References Cited

U.S. PATENT DOCUMENTS

| | | |
|---|---|---|
| 9,415,562 B1 | 8/2016 | Schaedler et al. |
| 2005/0089750 A1* | 4/2005 | Ng .................... H01M 2/0242 429/120 |
| 2008/0241664 A1 | 10/2008 | Nanjundaswamy et al. |
| 2010/0047671 A1 | 2/2010 | Chiang et al. |
| 2011/0206959 A1 | 8/2011 | Suppes |
| 2013/0187618 A1 | 7/2013 | Suppes |

\* cited by examiner

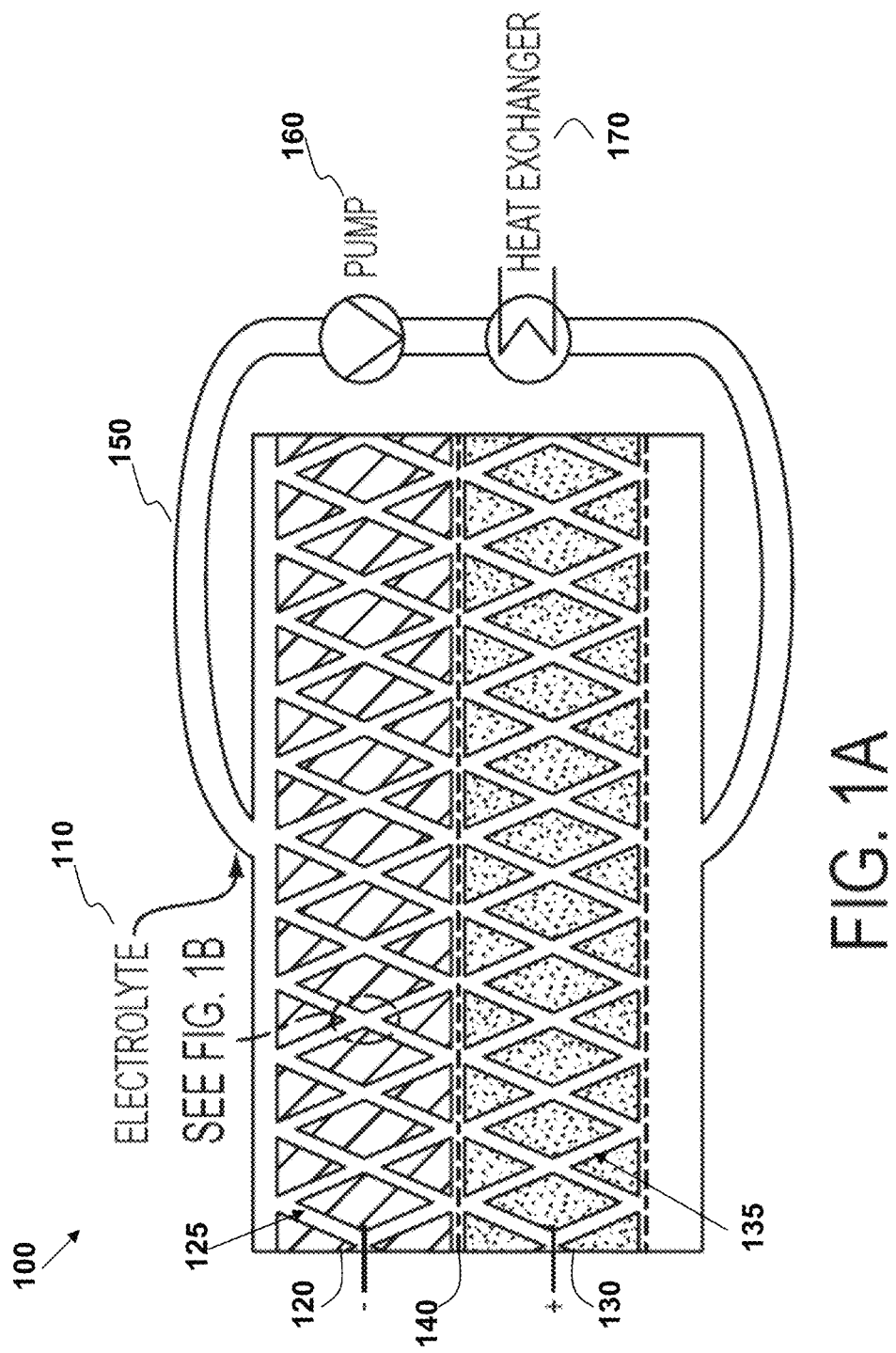

THREE-DIMENSIONAL MICRO-LATTICE BATTERY STRUCTURES WITH CONVECTIVE FLOW OF ELECTROLYTES

PRIORITY DATA

This patent application is a non-provisional application with priority to U.S. Provisional Patent App. No. 61/898,631 entitled "3D MICRO-LATTICE BATTERY WITH FLOWING ELECTROLYTES," filed Nov. 1, 2013, which is hereby incorporated by reference herein.

FIELD OF THE INVENTION

The present invention generally relates to battery structures that enable convective flow of electrolytes through the anode and cathode.

BACKGROUND OF THE INVENTION

In many commercial applications, battery energy performance, safety, and life usage are critical. Lithium-ion batteries are increasingly being used to meet the energy and power demands of consumer electronics and portable electronics as well as vehicles such as automobiles, electric bikes, airplanes, and satellites.

In conventional two-dimensional design in lithium-ion batteries, the electrodes are casted onto metal foil current collectors. Due to the poor electronic conductivity of the electrodes, slow ion transport, and high tortuosity of electrodes, layer thicknesses are limited to a range of 50-100 µm. Reducing the layer thickness to minimize the cell resistances comes at the price of reduced energy density and higher costs, as there are more inactive components (e.g. current collectors and separators) per unit mass of active materials. An ultra-thick electrode for battery is a practical approach to improve the energy density while reducing the costs. However, increasing the thickness of a battery electrode without compromising cell electrochemical performance such as power density and cycling stability is very challenging. As the electrode thickness increases, conventional electrodes suffer from resistance rise associated with both electronic and ionic transports. Higher resistance often translates to higher voltage loss for the cell.

A "convection battery" or "convection cell" forces flow of electrolyte through the cathode, anode, and the separator between them. Electrolytes are convected (transported by flow) by a mechanical pump through porous electrodes to decrease diffusion overpotential losses and make the potential more uniform throughout the electrode. One goal is to increase ion fluxes to realize the benefit of thicker electrodes, lower cost batteries, and reduced charge times. Electrolyte flow is used to reduce mass transfer overpotentials or to eliminate dendrite modes of failure. In particular, flow in a convection battery can reduce concentration overpotentials by 99% or more (see Gordon and Suppes, "Convection battery-modeling, insight, and review," *AIChE Journal*, Volume 59, Issue 8, pages 2833-2842, August 2013).

Generally, a convection battery utilizes principles of chemical engineering that are common in large chemical plants, such as heat integration and interaction with mass transport, within a battery configuration. In view of the ability of a convection battery to overcome both bulk diffusion and liquid-phase conductivity limitations, convection batteries have genuine potential to redefine the performance of batteries, such as lithium-ion batteries.

However, improved battery structures and frameworks are sought in order to realize this theoretical potential of convection batteries. Three-dimensional electrode and current-collector designs are needed that optimize both ion transport and electron transport. In addition, convenient methods to fabricate such structural battery designs are desired in the art.

SUMMARY OF THE INVENTION

The present invention addresses the aforementioned needs in the art, as will now be summarized and then further described in detail below.

In some variations, the invention provides a metal-ion battery system comprising:

a three-dimensional framework of conduits having electrically conductive walls;

a first electrode region comprising a first portion of the conduits and a first active electrode material outside of the first portion of the conduits;

a second electrode region comprising a second portion of the conduits and a second active electrode material outside of the second portion of the conduits; and an electrically insulating separator (to block electron flow) disposed between the first and second electrode regions.

In some embodiments, the system contains a liquid electrolyte within the conduits. The liquid electrolyte carries metal ions between the first and second electrode regions, wherein the metal ions may be selected from the group consisting of lithium ions, aluminum ions, sodium ions, potassium ions, magnesium ions, calcium ions, rubidium ions, and combinations thereof. In certain embodiments pertaining to lithium-ion batteries, the liquid electrolyte carries lithium ions between the first and second electrode regions.

In some embodiments, the system contains a liquid or gas coolant within the conduits. When a coolant is contained within the conduits, liquid electrolyte is contained within the first and second active electrode materials, but not in the conduit, unless the electrolyte functions also as a coolant.

In some embodiments, the three-dimensional framework includes one or more metals, carbon, one or more conductive polymers, or a combination thereof. The three-dimensional framework may be a metallic framework, for example.

In some embodiments, the separator is a porous membrane that is permeable to the metal ions. In some embodiments, the separator is a solid-electrolyte separator.

The system may further comprise a pump in fluid communication with the first and second electrode regions. The system may further comprise a heat exchanger in fluid communication with the first and second electrode regions.

Some variations of the invention provide a lithium-ion battery system with electrolyte flow and optionally convective heat transfer, the system comprising:

(a) a positive electrode comprising a lithium-containing active positive-electrode material and a first conductive network with hollow liquid-transport conduits;

(b) a negative electrode comprising a lithium-containing active negative-electrode material and a second conductive network with hollow liquid-transport conduits;

(c) a separator that electronically isolates the positive and negative electrodes;

(d) a liquid electrolyte contained within the hollow liquid-transport conduits of the first and second conductive networks, wherein walls of the hollow liquid-transport conduits are positive-electrode and negative-electrode current collectors within the first and second conductive networks, respectively.

In some embodiments, the first conductive network comprises an ordered micro-lattice metallic structure containing the hollow liquid-transport conduits as structural members. In these or other embodiments, the second conductive network comprises an ordered micro-lattice metallic structure containing the hollow liquid-transport conduits as structural members.

In certain lithium-ion battery systems, either or both of the first and second conductive networks comprise an micro-lattice structure containing the hollow liquid-transport conduits as structural members, wherein the macro-lattice structure comprises a cellular material formed of hollow tubes having a pore size from about 10 microns to about 1000 microns. In some embodiments, these hollow tubes have an average wall thickness from about 0.1 microns to about 10 microns.

The hollow tubes are preferably formed from an electronically conductive material, such as an electronically conductive material selected from the group consisting of Al, Cu, Ni, C, Ti, Au, Pt, carbon, electrically conductive polymers, and combinations or alloys thereof.

Some embodiments provide a structural battery comprising the lithium-ion battery system as described, wherein the first and second conductive networks each comprise an ordered micro-lattice metallic structure containing the hollow liquid-transport conduits as structural members of the structural battery.

In some embodiments, in the first conductive network, the walls of the hollow liquid-transport conduits are permeable to the liquid electrolyte. In these or other embodiments, in the second conductive network, the walls of the hollow liquid-transport conduits are permeable to the liquid electrolyte. The separator may be a solid electrolyte layer that is impermeable to the liquid electrolyte.

The system further comprises a housing that encloses the positive electrode, the negative electrode, and the separator, in some embodiments, wherein the housing is configured with one or more electrolyte inlets and/or outlets for feeding the liquid electrolyte to, or purging the liquid electrolyte from, the system.

The system optionally further comprises a pump configured to circulate the liquid electrolyte through the hollow liquid-transport conduits in the first conductive network and/or in the second conductive network. The system optionally further comprises a filtration unit to filter the liquid electrolyte. The system optionally further comprises a heat exchanger configured to heat or cool the liquid electrolyte.

Other variations of the invention provide a lithium-ion battery system with coolant flow and optionally convective heat transfer, the system comprising:

(a) a positive electrode comprising a lithium-containing active positive-electrode material and a first conductive network with hollow liquid-transport conduits;

(b) a negative electrode comprising a lithium-containing active negative-electrode material and a second conductive network with hollow liquid-transport conduits;

(c) a separator that electronically isolates the positive and negative electrodes;

(d) a liquid electrolyte contained within the first and second conductive networks, outside of the hollow liquid-transport conduits; and (e) a coolant contained within the hollow liquid-transport conduits of the first and second conductive networks, wherein walls of the hollow liquid-transport conduits are impermeable to the liquid electrolyte and to the coolant.

In some embodiments, walls of the hollow liquid-transport conduits function as positive-electrode and negative-electrode current collectors within the first and second conductive networks, respectively.

The first conductive network and/or second conductive network may include an ordered micro-lattice metallic structure containing the hollow liquid-transport conduits as structural members.

In some embodiments, either or both of the first and second conductive networks comprise an micro-lattice structure containing the hollow liquid-transport conduits as structural members, wherein the macro-lattice structure comprises a cellular material formed of hollow tubes having a pore size from about 10 microns to about 1000 microns. The hollow tubes may have an average wall thickness from about 0.1 microns to about 10 microns, for example.

In some embodiments, the hollow tubes are formed from an electronically conductive material, such as a material selected from the group consisting of Al, Cu, Ni, C, Ti, Au, Pt, carbon, electrically conductive polymers, and combinations or alloys thereof.

The system optionally further comprises a housing that encloses the positive electrode, the negative electrode, and the separator, wherein the housing is configured with one or more coolant inlets and/or outlets. The system optionally further comprises a pump configured to circulate the coolant through the hollow liquid-transport conduits in the first conductive network and/or in the second conductive network. The system optionally further comprises a heat exchanger configured to heat or cool the coolant.

BRIEF DESCRIPTION OF THE DRAWINGS

FIG. 1A is a schematic of a metal-ion battery with a three-dimensional metallic framework that enables the circulation of electrolyte.

DETAILED DESCRIPTION OF EMBODIMENTS OF THE INVENTION

Figure 1B:
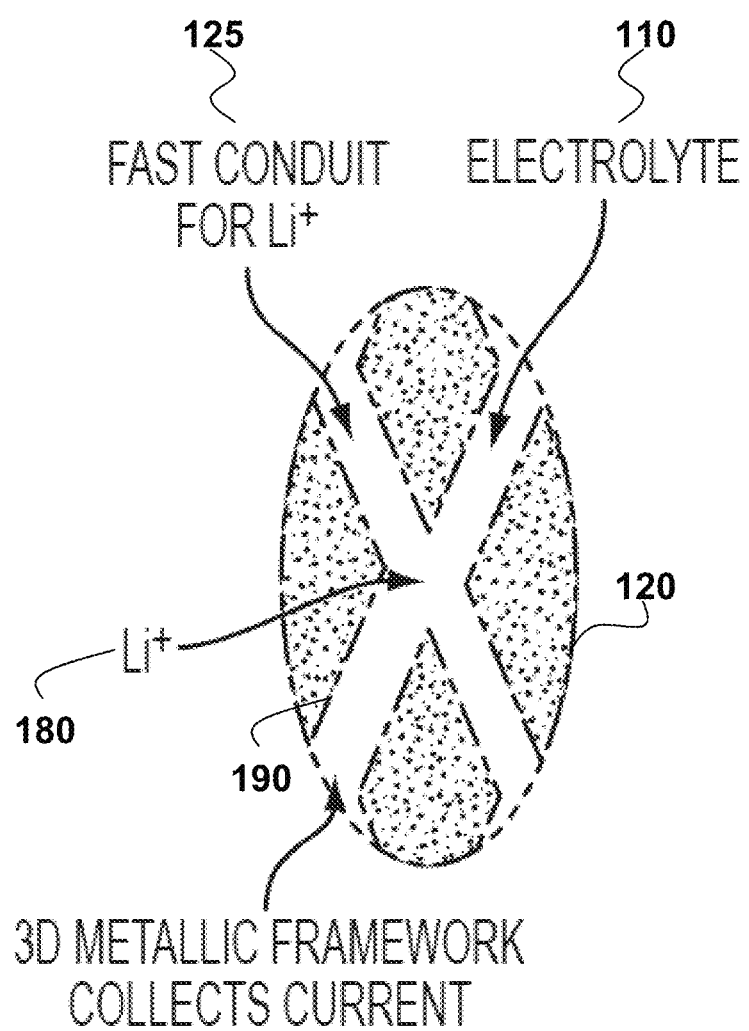
FIG. 1B is a schematic of a portion of the negative electrode in FIG. 1A, in certain embodiments providing a lithium-ion battery.

The structures, apparatus, systems, and methods of the present invention will be described in detail by reference to various non-limiting embodiments and figures.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing parameters, conditions, results, and so forth used in the specification and claims are to be understood as being modified in all instances by the term "about." Accordingly, unless indicated to the contrary, the numbers set forth in the following specification and attached claims are approximations that may vary depending upon specific algorithms and calculations.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Embodiments of the present invention will now be described in detail, including reference to the accompanying figures. The figures provide representative illustration of the invention and are not limiting in their content. It will be understood by one of ordinary skill in the art that the scope of the invention extends beyond the specific embodiments depicted. For instance, the invention is by no means limited to lithium-ion batteries. In metal-ion batteries of the invention, the metal ions may be selected from the group consisting of lithium ions, aluminum ions, sodium ions, potassium ions, magnesium ions, calcium ions, rubidium ions, and combinations thereof. For convenience, much of this description is directed to lithium-ion batteries as a preferred but non-limiting example.

The primary functional components of a typical lithium-ion battery are the anode, cathode, and electrolyte, in which a lithium ion moves between the anode and cathode in the electrolyte. A separator is used to separate cathode and anode to prevent an electrical short-circuit. Current collectors, normally metal, are used to collect electrons from both cathode and anode. The lithium ion moves from the anode to the cathode during discharge and from the cathode to the anode when charging.

Both the anode and cathode are materials into which and from which lithium can migrate. The process of lithium moving into the anode or cathode is referred to as insertion (or intercalation), and the reverse process, in which lithium moves out of the anode or cathode is referred to as extraction (or deintercalation).

In preferred embodiments, the battery metal ions are lithium ions. The anode material must be capable of incorporating lithium ions during battery charging, and then releasing the lithium ions during battery discharge. The cathode material must be capable of supplying lithium ions during battery charging, and then incorporating the lithium ions during battery discharge.

In other embodiments, the battery metal ions are selected from the group consisting of aluminum ions, sodium ions, potassium ions, magnesium ions, calcium ions, rubidium ions, and combinations thereof.

Current collectors generally collect electrical current generated and provide an efficient surface for attachment of electrical contacts leading to the external circuit. Current collectors may be made from any suitable materials, such as (but not limited to) Al, Cu, Ni, C, Ti, Au, or Pt. Current collectors may also be fabricated from alloys, such as stainless steel.

Some variations of the invention are premised on a new battery structure enabling arterial flow (i.e., convective transport in "arteries" or conduits) of electrolytes through three-dimensional (3D) structured electrodes (anodes and/or cathodes, along with current collectors and separators). As will be described in detail below, a hierarchical battery structure design incorporates 3D metal structures with fluid-transport capabilities. The disclosed battery electrode design facilitates electronic transport (through 3D structured metal current collectors) and ionic transport (through flowing electrolyte in the conduits). In some embodiments, the 3D metallic framework can be designed as a fast conduit for electron and ion transport with permeable walls (walls of the conduits). This configuration allows ion transport inside the tubes, through the tube walls, and into the 3D volume—thereby penetrating the whole active battery material.

In conventional two-dimensional (2D) electrodes with a metal-foil current collector for lithium-ion batteries, the thickness of the electrodes is limited (<200 μm in thickness) due to poor electronic conductivity of the electrodes and slow ionic transport through the pores of electrodes. The disclosed 3D structured flow design for battery electrodes enables ultra-thick battery electrodes (>1 millimeter in thickness) with improved electronic and metal-ion transport.

Ultra-thick electrodes enabled by 3D metal structures can effectively improve the energy density by reducing number of electrode layers (less inactive components such as separator, current collector, and packaging) in a battery. In addition, the forced-flow electrolyte can dramatically enhance the battery safety. During normal battery operations, circulation of the electrolyte provides better thermal management of the battery to improve battery safety and battery life. If necessary, the electrolyte can be purged out of the battery to prevent thermal runaway.

Some variations of the invention may be illustrated by FIG. 1A, which shows the cross-sectional view 100 of metal-ion battery electrodes 120, 130 fabricated with 3D arterial flow networks. The hierarchical battery structure design in FIG. 1A is composed of 3D structured frameworks of conduits 125, 135 embedded in each of the negative (120) and positive (130) electrodes, respectively. Under normal battery operation, the negative electrode 120 is the battery anode, while the positive electrode 130 is the battery cathode. The separator 140 prevents electrical short between electrodes. The pump 160 and heat exchanger 170 are each optional. The pump 160 is used to circulate the electrolyte 110 through an external conduit 150. If necessary or desired, the electrolyte 110 can be purged out of the battery to prevent thermal runaway. A heat exchanger 170 may also be coupled to the circulating electrolyte 110 to provide active thermal management during battery operations.

The structured frameworks can serve as hollow conduits 125, 135 (see FIG. 1B) to allow transport of fluids (such as electrolyte 110) throughout the network. As used herein, "hollow" conduits 125, 135 have at least some open space that allows liquid electrolyte 110 to enter and fill the space. In the embodiment depicted in FIG. 1B, the metal ions are lithium ions 180 and the 3D framework is a metallic framework 190. The 3D metallic framework 190 may include conduits 125 with permeable walls (as shown in FIG. 1B), which allow metal ions (e.g., lithium ions 180) to permeate from within the conduit 125 and through the wall, to penetrate the active battery materials.

It is noted that in certain alternative embodiments, only one of the positive or negative electrodes includes the 3D structured frameworks 120 or 130 (and optional pump 160 and heat exchanger 170); the other electrode may be any conventional electrode.

Figure 2:
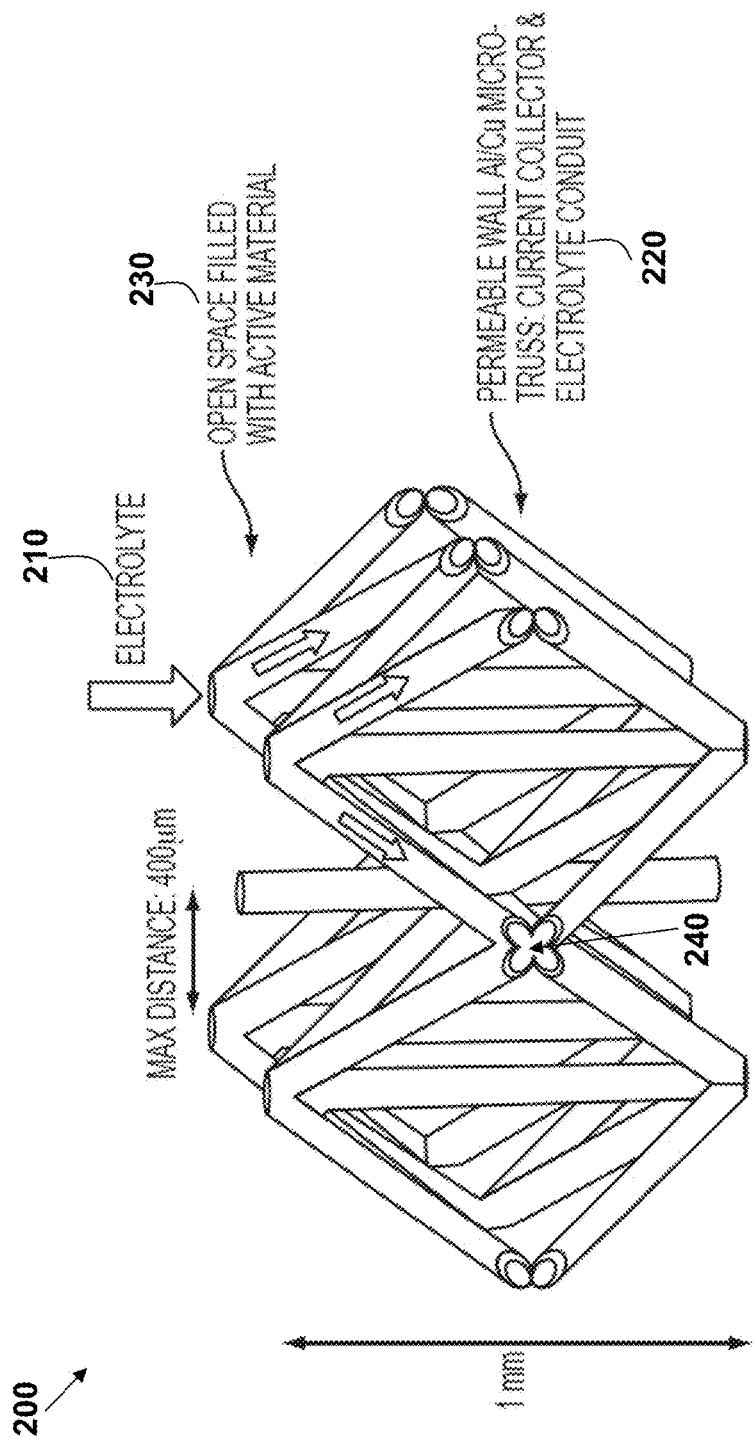
FIG. 2 is a depiction of a 3D structured design incorporating a periodic architecture of hollow tubes that connect at nodes, forming an octahedral unit cell, in some embodiments.

FIG. 2 depicts a particular embodiment of a 3D structured current collector design for battery electrodes. In FIG. 2, a portion of a 3D structured micro-truss framework 200 is shown in which aluminum/copper conduits 220 (hollow tube lattice members) have a permeable wall allowing electrolyte 210 to both flow through the conduits 220 as well as through the conduit 220 walls, thereby carrying metal ions through the walls and into the active material that is present in the open space 230 outside the conduits 220. Electrolyte 210 is shown entering at the top of the drawing. FIG. 2 is a periodic architecture of hollow tubes (conduits 220) that connect at nodes 240, forming an octahedral unit cell. Distinct length scales, which are exemplary only, are illustrated. The unit cell 200 has a length scale of about 1 mm, the distance between nodes 240 is about 400 μm, and the average transport length for metal ions and electrons is about 50 μm. The length scales can be controlled independently providing exceptional control over the design and properties of the micro-lattice, and therefore the resulting structural electrode.

As explained in the Background, increasing the thickness of a battery electrode without compromising cell electrochemical performance such as power density and cycling stability is very challenging. As the electrode thickness increases, conventional 2D electrodes suffer from resistance rise associated with both electronic and ionic transports. Higher resistance often translates to higher voltage loss for the cell. The total voltage loss $\Delta V_{total loss}$ of a battery can be expressed as:

$$\Delta V_{total\ loss} = \Delta V_{electronic\ loss} + \Delta V_{ionic\ loss} + \Delta V_{ion\ diffusion\ loss}$$

where $\Delta V_{electronic\ loss}$ is voltage loss associated with electronic resistance of the electrodes, $\Delta V_{ionic\ loss}$ is voltage loss associated with ionic resistance of the electrodes, and $\Delta V_{ion\ diffusion\ loss}$ is voltage loss associated with diffusion-related ion-depletion resistance.

The structures described herein can effectively resolve two of the voltage loss issues associated with ultra-thick electrodes. Specifically, the 3D metallic networks can reduce $\Delta V_{electronic\ loss}$ and flowing electrolyte can reduce $\Delta V_{ion\ diffusion\ loss}$.

In addition, the circulating electrolytes 110, 210 (by a pump 160 or other means for causing convective mass flow) provide other important benefits. For example, the internal temperature of the battery can be actively controlled through the circulating electrolyte coupled with a heat exchanger. Especially during high power demands, the battery internal temperature can increase significantly which could cause severe damage to the battery life. Circulating the electrolyte 110, 210 through the internal network of the battery can dissipate hot spots caused by transient thermal spikes or localized thermodynamic heating. When integrated with a heat exchanger and suitable controller, thermal management is possible for the overall battery system. Furthermore, during unlikely events such as internal shorting, the electrolyte 110, 210 may be purged out immediately, or replaced (at least in part) with fire-retardant fluids to prevent thermal runaway.

Figure 3:
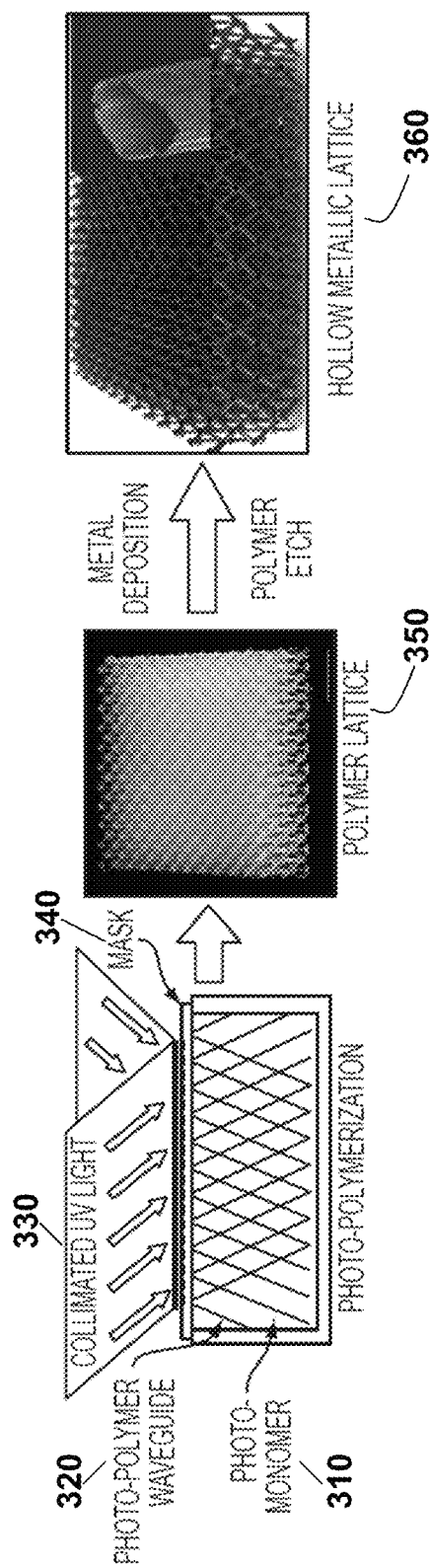
FIG. 3 is a flowchart of a technique for fabricating a micro-lattice structure that may be utilized in 3D structured battery electrodes, in some embodiments.

FIG. 3 is a flowchart of a technique for fabricating a micro-lattice 360 that may be utilized in 3D structured battery electrodes, in some embodiments. As shown in FIG. 3, micro-lattice templates 350 may be fabricated using a self-propagating photopolymer waveguide technique reported previously (see Jacobsen et al., "Micro-scale Truss Structures formed from Self-Propagating Photopolymer Waveguides," Advanced Materials 19 3892-3896 (2007), which is hereby incorporated by reference herein). In this technique, a suitable liquid photomonomer 310 is exposed to collimated UV light 330 through a patterned mask 340, producing interconnected three-dimensional photopolymer waveguides 320 that produce the polymer lattice 350. A non-limiting example of a suitable liquid photomonomer 310 is thiol-ene resin.

A wide array of different architectures with unit cells in the range for example of 0.1 mm to 1 mm (or higher) can be made by altering the mask 340 pattern and the angle of the incident light 330 (see Jacobsen et al., "Shear behavior of polymer micro-scale truss structures formed from self-propagating polymer waveguides," ActaMaterialia 56 2540-2548 (2008), which is hereby incorporated by reference herein). As a non-limiting example, architectures may be generated with 0.5-1 mm lattice member length, 20-100 μm lattice member diameter, and 60° inclination angle.

A conductive thin film with for example 0.1-5 μm wall thickness is then deposited on the polymer lattice 350 (template), which is shown in the middle of FIG. 3. The conductive thin film may be deposited on the polymer lattice 350 by various techniques, such as (but not limited to) electroless plating, atomic layer deposition, sol-gel deposition, chemical vapor deposition, or physical vapor deposition.

To produce the metallic lattice 360, in some embodiments, the thin film may be rendered porous by dealloying, selective etching of inclusions in the film (e.g. polymer inclusion into electroplated metal films), or patterned thin film deposition. An exemplary technique for dealloying is described in Erlebacher et al., "Evolution of nanoporosity in dealloying" *Nature* 410 p. 450 (2001), which is hereby incorporated by reference herein.

The polymer lattice 350 template may subsequently be etched out via chemical etching or any other suitable etching technique that is gentle enough not to destroy the micro-lattice. Organic solvents, plasma etching, or thermal pyrolysis may be utilized. The etchant or etching technique should be selective, i.e., the etching rate of the polymer template needs to be substantially faster than the etching rate of the coating (conductive thin film). For copper coatings on thiol-ene templates, as an example, sodium hydroxide solution is a preferred etchant because sodium hydroxide does not attack the copper film if it is biased with 1.5-2.5 volts.

When chemical etching is employed, the conditions should be adjusted to provide enough agitation to dissolve the polymer in the hollow tubes but limit the forces (such as capillary forces) acting on the micro-lattice, to avoid fracture. Successful etching conditions may be achieved, in some embodiments, by inserting shields around the micro-lattice to protect it from the solution flow. Below a certain wall thickness, depending on the architecture, the micro-lattice 350 is too fragile to remove them from the liquid. In this case, freeze drying is employed to remove the liquid. For example, a solvent exchange may be performed to exchange aqueous sodium hydroxide with t-butanol and then freezing the t-butanol containing the micro-lattice. t-Butanol exhibits a much lower volume change on freezing than water, resulting in less damage to the micro-lattice. A vacuum may then be applied to sublimate the t-butanol, leaving a dry micro-lattice (hollow metallic lattice 360) behind.

The result of this exemplary procedure is a hollow conductive lattice 360. In the embodiment of FIG. 3 (right side), following metal deposition and polymer removal by etching, the hollow conductive lattice 360 is a metallic lattice. Some embodiments provide a cellular material formed of hollow tubes, the cellular material having a relative density in a range of about 0.001% to 10%, such as about 0.01% to 1%. The relative density is the ratio of the density of the cellular (porous) material to the density of the constituent material of the micro-lattice. The pore size of the cellular material may be from about 1 μm to about 1 mm, such as about 10 μm to about 500 μm.

Any suitable material can be deposited on the polymer lattice 350, including but not limited to nickel, zinc, chrome, tin, copper, gold, silver, platinum, rhodium, aluminum, carbon, diamond, alumina, zirconia, tin oxide, zinc oxide, silicon carbide, silicon nitride, titanium nitride, tantalum nitride, tungsten nitride, or combinations or alloys thereof, including multiple layers of different materials.

For example, the autocatalytic electroless nickel plating reaction enables deposition of thin films with controlled thickness on complex shapes and inside pores. By controlling reaction time, a wall thickness of about 100 nm can be achieved while maintaining a uniform conformal coating. The resulting ultra-light hollow metallic lattice 360 essentially translates the deposited nanoscale thin film in three dimensions to form a macroscopic material where the base structural elements are hollow tubes.

Figure 4:
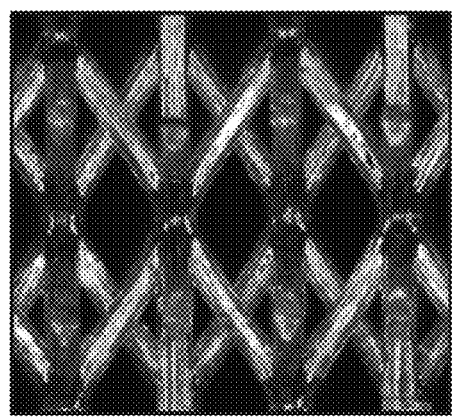
FIG. 4 is an exemplary hollow copper micro-truss with a pore size of about 500 μm.
Figure 5:
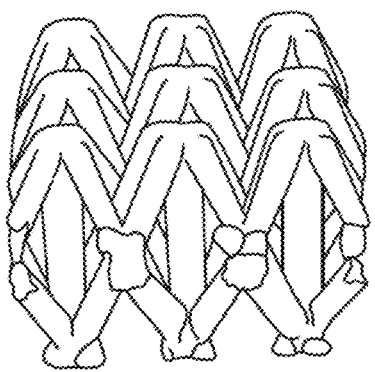
FIG. 5 is an exemplary hollow micro-truss, which may be for example a hollow aluminum micro-truss.
Figure 6:
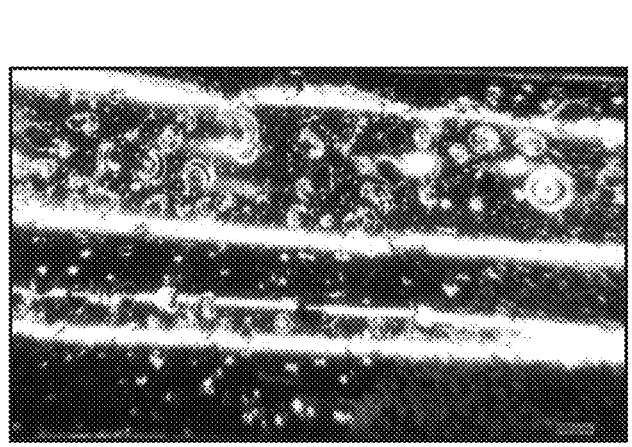
FIG. 6 is an exemplary copper-plated micro-truss with pores on the order of 50 μm.

FIGS. 4-6 depict exemplary micro-truss structures. FIG. 4 shows a hollow copper micro-truss 400 with a pore size of about 500 μm. FIG. 5 shows a hollow micro-truss 500, which may be for example a hollow aluminum micro-truss 500. FIG. 6 shows a copper-plated micro-truss 600 with pores on the order of 50 μm, demonstrating that hollow porous tubes can be fabricated at the desired size scale. Hollow tube diameter and wall thickness can be altered independently; when combined with conformal thin-film coating methods, micro-lattice structures 400, 500, 600 with a wide range of constituent compositions and dimensions are available.

The conductive lattice (e.g., micro-lattice 360, 400, 500, or 600) is then filled with active electrode materials, whereby the electrode material is filled around the hollow tubes (not into the tubes). The lattice structure may be designed to facilitate filling. To densify the material, the whole structure may be calendered (i.e. mechanically pressed or leveled).

The above procedure may be repeated to fabricate another electrode, so that negative and positive electrodes are obtained for assembly. The two electrodes may then be pressed together, separated by one or more separators, in a layered configuration. The two electrodes may be constructed differently, such as with different lattice spacings, tube diameters, tube lengths, metal compositions, and so on. Optionally, one of the electrodes is a conventional electrode without 3D structured metal current collectors.

Figure 7:
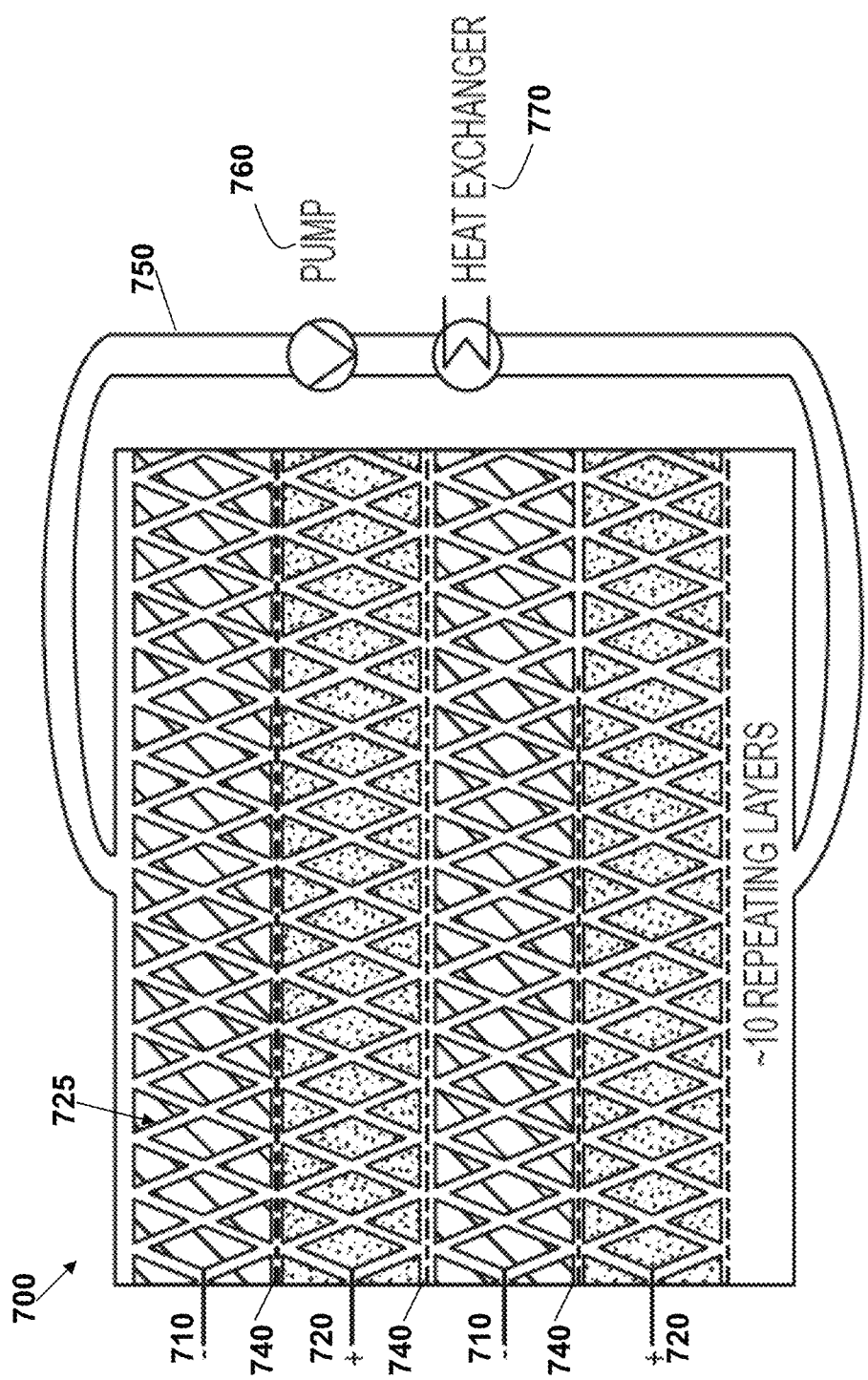
FIG. 7 is an example of a battery cell design, in some embodiments. The battery structure includes multiple layers comprising negative and positive electrodes, each separated by a separator layer.

FIG. 7 is an example of a battery cell design, in some embodiments. The battery structure 700 of FIG. 7 includes multiple layers comprising negative (710) and positive (720) electrodes, each separated by a separator layer 740. As indicated there may be 10 repeating layers, or another number of layers. A pump 760 and heat exchanger 770 are also included. Structured frameworks of conduits 725 are embedded in the electrodes. An external conduit 750 is used to transport electrolyte.

Figure 8:
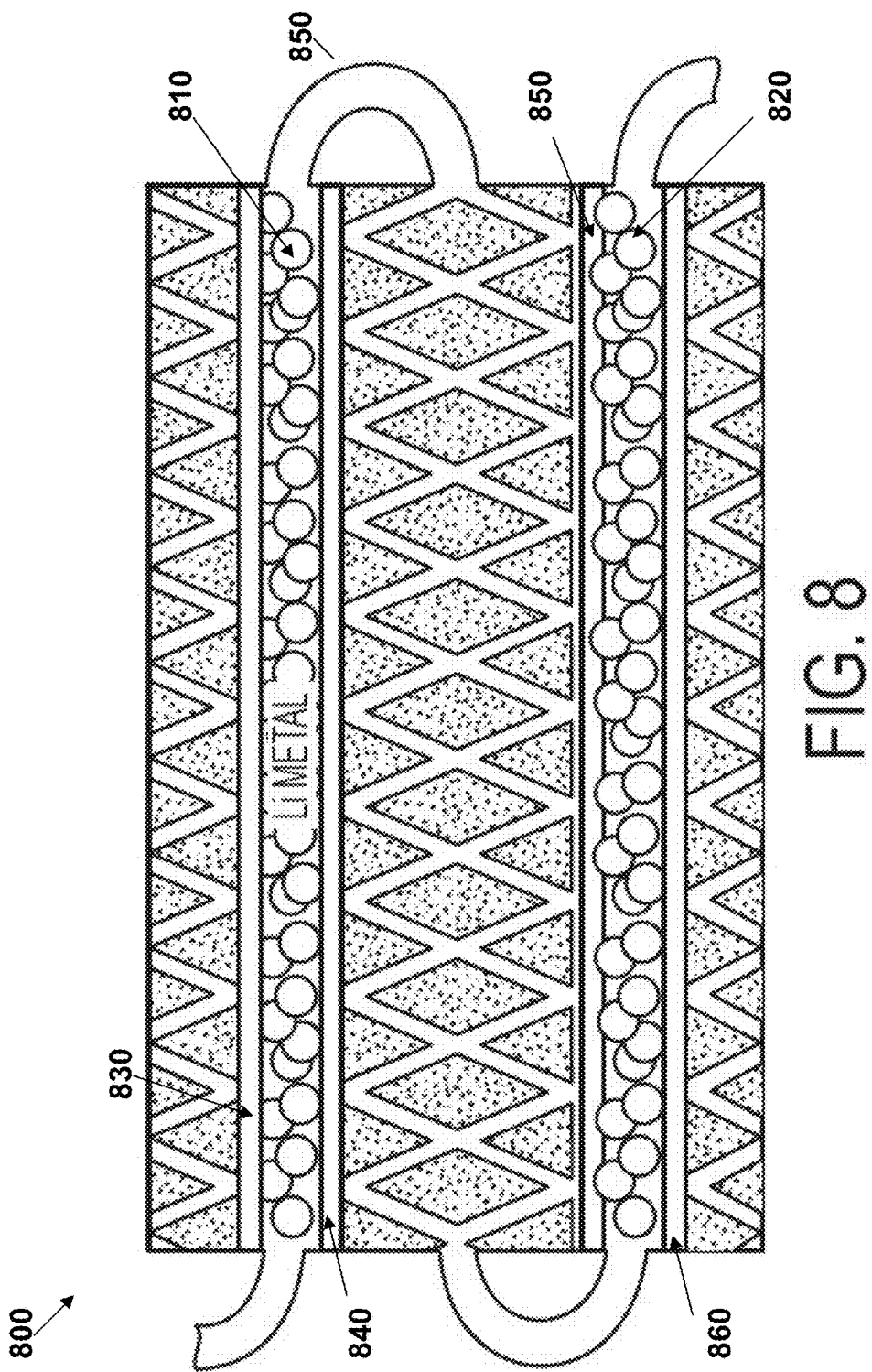
FIG. 8 is an example of a battery cell design including a thin solid electrolyte, in some embodiments.

FIG. 8 is another example of a battery cell design 800 in some embodiments. Thin solid electrolyte, impermeable to the liquid electrolyte, may be utilized for separators 830, 840, 850, and 860. Liquid electrolyte is circulated separately in the anode 810 and cathode 820, in external conduits 850, to provide ion transport.

Figure 9:
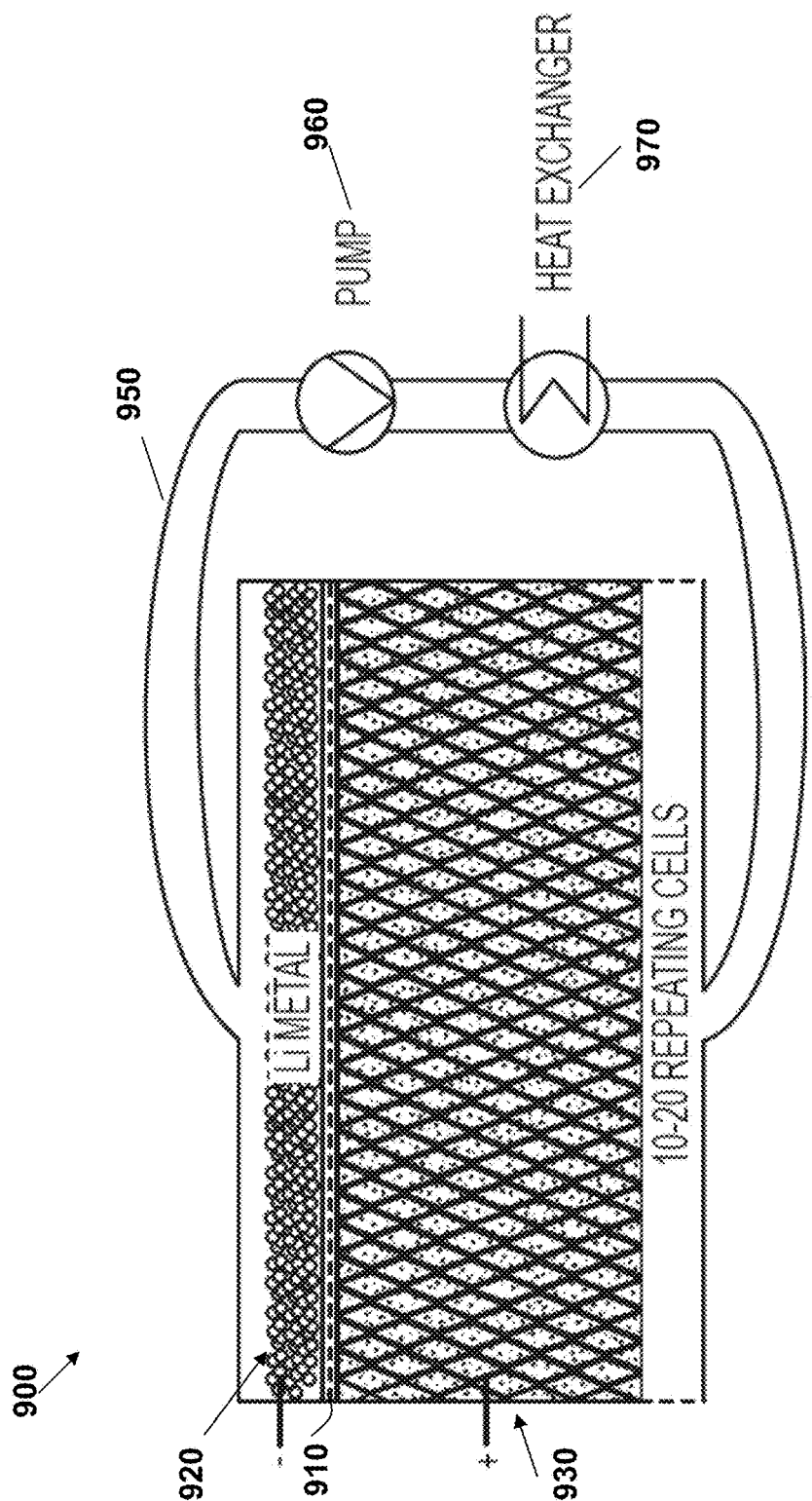
FIG. 9 is an example of a battery cell design including a thick porous separator, in some embodiments.

FIG. 9 is another example of a battery cell design 900 including a thick porous separator 910, anode 920, and cathode 930. When the separator 910 is a thick porous membrane to prevent shorting, a Li-metal anode 920 may be employed. The flowing electrolyte in external conduit 950 enables a thicker separator 910 by overcoming Li-ion transport limitations. FIG. 9 indicates 10-20 repeated cells in the overall structure, which is a non-limiting number of layers. A pump 960 and heat exchanger 970 are also included.

The battery structure may be filled with electrolyte following fabrication of the hollow conductive lattice and/or following incorporation into a battery. Alternatively, or additionally, electrolyte may be filled at a later time, such as following sale or shipment and before commercial use. The liquid electrolyte may be added to the electrode structure using a pump, such as the pump 160 that is part of the system (FIG. 1), or other means of introducing the electrolyte. The electrolyte may be fed into the hollow tubes at one or more points. When the hollow tubes contain porous walls that are permeable to the electrolyte, the electrolyte may be introduced either into the tubes or into the electrode active material at any convenient location, because in this case the electrolyte will automatically fill all the porosity and hollow tubes.

In some embodiments, the 3D current collector is designed to carry a mechanical load. By increasing the thickness of the hollow tube walls, for example, high compressive strength, tensile strength, and/or bending stiffness may be achieved. The ability to carry a mechanical load is important in certain applications of structural batteries.

In some variations, this invention provides a positive electrode comprising active cathode material and a cathode network of electrically conductive material. Preferably, the active cathode material contains lithium, such as lithium metal oxide, lithium phosphate, or lithium silicate. Exemplary cathode materials suitable for the present invention include, but are not limited to, $LiMO_2$ (M=Co, Ni, Mn, or combinations thereof); $LiM_2O_4$ (M=Mn, Ti, or combinations thereof); $LiMPO_4$ (M=Fe, Mn, Co, or combinations thereof); and $LiM_xM'_{2-x}O_4$ (M, M'=Mn or Ni). The active cathode material optionally contains sodium (Na).

The cathode may further comprise one or more conductive fillers to provide enhanced electronic conductivity. Examples of conductive fillers include, but are not limited to, conductive carbons, graphites, activated carbon fibers, non-activated carbon nanofibers, metal flakes, metal powders, metal fibers, carbon fabrics, metal mesh, and electrically conductive polymers. The cathode may also further comprise other additives such as, for example, alumina, silica, and transition-metal chalcogenides.

The cathode may also comprise a binder. The choice of binder material may vary widely provided that it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, polytetrafluoroethylenes, polyvinylidene fluorides, ethylene-propylene-diene rubbers, polyethylene oxides, acrylates, methacrylates, divinyl ethers, and the like.

The cathode network of electrically conductive material may include a network of hollow tubes, such as hollow metal tubes. The metal may be selected from Cu, Al, Ni, Ti, Au, Pt, or other metals (or combinations or alloys thereof). In some embodiments, the hollow tubes are conductive carbon tubes. In some embodiments, the hollow tubes are electrically conductive polymer tubes. A combination of these materials is also possible.

Preferably, the tube (conduit 135) walls are permeable to electrolyte. Metallic tube walls may be made permeable through a dealloying process, for example. Hollow tubes may be formed by a 3D weaving technique. Hollow micro-truss structures may be employed on the cathode side, as described in U.S. patent application Ser. No. 13/584,108, filed Aug. 13, 2012 for "ULTRA-LIGHT MICRO-LATTICES AND A METHOD FOR FORMING THE SAME" (Schaedler et al.), which is hereby incorporated by reference herein.

In some variations, this invention provides a negative electrode comprising active anode material and an anode network of electrically conductive material. Preferably, the active anode material contains, or is capable of chemically or physically containing, lithium ions. Exemplary anode materials suitable for the present invention include, but are not limited to, carbon materials such as graphite, coke, soft carbons, and hard carbons; and metals such as Si, Al, Sn, or alloys thereof. Other exemplary anode materials include titanium oxides, germanium, copper/tin, and lithium compounds containing metal oxides, such as oxides of W, Fe, and Co. Anodes can also include fillers and binders. Optionally, anode materials contain sodium.

Preferably, the anode material consists essentially of graphitic carbon or another electron-conducting carbon. Some examples of electron-conducting carbon include natural graphites, such as flaky graphite, plate-like graphite, and other types of graphite; high-temperature sintered carbon products obtained, for example, from petroleum coke, coal coke, celluloses, saccharides, and mesophase pitch; artificial graphites, including pyrolytic graphite; carbon blacks, such as acetylene black, furnace black, Ketjen black, channel black, lamp black, and thermal black; asphalt pitch, coal tar, active carbon, mesophase pitch, and polyacetylenes.

The anode network of electrically conductive material may include a network of hollow tubes, such as hollow metal tubes. The metal may be selected from Al, Cu, Ni, Ti, Au, Pt, or other metals (or combinations or alloys thereof). In some embodiments, the hollow tubes are conductive carbon tubes. In some embodiments, the hollow tubes are electrically conductive polymer tubes. A combination of these materials is also possible.

Preferably, the tube (conduit 125) walls are permeable to electrolyte. Metallic tube walls may be made permeable through a dealloying process, for example. Hollow tubes may be formed by a 3D weaving technique. Similar to the cathode side, as described above, hollow micro-truss structures may be employed on the anode side.

The liquid electrolyte is filled within both the positive electrode and negative electrode, or when multiple electrode layers are present, within all of the layers. As indicated earlier, the liquid electrolyte may be absent in some embodiments since it may be conveniently added after fabrication but prior to battery operation.

Liquid or gel electrolytes may be employed. The electrolyte may be aqueous or nonaqueous. The electrolyte generally includes a solvent and a metal salt, which may be a lithium salt (anion plus lithium cation). Examples of the solvent that may be used include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones. Ethylene carbonate and propylene carbonate are preferable. As is known in the art, other minor components and impurities may be present in the electrolyte composition.

Lithium salts include, but are not limited to, $LiClO_4$, $LiBF_4$, $LiPF_6$, $LiCF_3SO_3$, $LiCF_3CO_2$, $LiAsF_6$, $LiSbF_6$, $LiAlCl_4$, LiCl, LiBr, and LiI, which may be used alone or as a mixture of two or more of these. $LiBF_4$ and $LiPF_6$ are preferable, in some embodiments. The concentration of the salt is not particularly limited, but preferably is about 0.1 to 5 mol/L of the electrolytic solution.

An electrically insulating separator is positioned between the positive electrode and negative electrode, or when multiple electrode layers are present, positioned between each layer to prevent electrical shorting. That is, the separator prevents electrical current from flowing between the electrodes without passing through an external circuit.

Examples of electrically insulating separators include cellulosic materials (e.g., paper), non-woven fabrics (e.g., cellulose/rayon non-woven fabric), microporous resin films, and porous metal foils. The separator can be an insulating thin film that is high in ion permeability and that has a prescribed mechanical strength. As the material of the separator, an olefin polymer, a fluorine-containing polymer, a cellulose polymer, a polyimide, a nylon, glass fiber, or alumina fiber, in the form of a non-woven fabric, a woven fabric, or a microporous film, may be used. These separators are preferably soaked (at least initially) in an organic electrolyte. The separator material should be stable in the presence of the organic electrolyte (when present), which may be the same or different than the liquid electrolyte that will be circulated in the battery.

For battery operation, an external circuit needs to be configured in electrical communication with the electrically conductive conduit walls (which function as current collectors).

Optionally, one or more pumps are included to circulate the liquid electrolyte from the positive electrode, across the separator, to the negative electrode, through the pump, and back to the positive electrode. A pump may also be configured in the reverse flow direction, circulating the electrolyte from the negative electrode, across the separator, to the positive electrode, through the pump, and back to the negative electrode. Pumped fluid enhances isothermalization of the battery, reducing hotspots and increasing battery lifetime.

Any known type of pump may be employed, such as a positive displacement pump, a rotary pump, a reciprocating pump, a gear pump, a screw pump, a progressing cavity pump, a roots-type pump, a peristaltic pump, a plunger pump, a syringe pump, a plunger pump, a double-diaphragm pump, an impulse pump, a radial-flow pump, an axial-flow pump, or an eductor-jet pump. Optionally, the pump causes oscillatory flow, which could be in addition to recirculating flow or instead of recirculating flow.

The flow rate of liquid electrolyte may vary widely, depending on battery design and basis of operation. In some embodiments, turbulent flow of electrolyte promotes good heat and mass transfer of electrolyte. In some embodiments, the flow of electrolyte is turbulent in the larger channel outside of the electrode (where the pump is located) but laminar within the electrode conduits, due to the smaller pore diameter and resulting lower Reynolds number. Laminar flow may be preferred to minimize mechanical wear on the electrodes, for example, whereas at the heat exchanger turbulent flow gives better heat transfer, as is known from chemical-engineering principles.

One or more electrolyte distribution manifolds may be included. Electrolyte distribution manifolds promote the consolidation of the flow from multiple channels inside an electrode to fewer, larger channels outside the electrode. This consolidation enables reduced frictional pressure losses outside the electrodes and facilitates pumping with lower energy consumption.

One of more heat exchangers may also be provided in the system, to enable heat transfer to or from the pumped electrolyte. For example, the heat exchanger(s) may be designed to remove heat from the battery, during normal operation, periodically, or in response to upset conditions (such as thermal transients). The heat exchanger(s) may be alternatively, or additionally, designed to add heat to the battery, such as to heat up a battery situated in a cold external environment. The heat may be transferred to/from a fluid which is a liquid, a gas, a two-phase fluid, or a multi-component fluid, for example.

A filter may be included within the recirculation line, such as before or after the pump or heat exchanger, to remove impurities that may build up over time or following some type of upset.

A purge apparatus may be included within the recirculation line, such as before or after the pump or heat exchanger. The purge apparatus may allow the electrolyte to drain out of the battery under the force of gravity. In some embodiments, a purge apparatus is configured to pump another fluid through the battery to remove the electrolyte via fluid pressure. Such fluid could be a liquid, gas (e.g., air), two-phase fluid, or multi-component fluid. Preferably such fluid does not chemically or physically react with any of the components of the battery.

In certain embodiments, the electrolyte is confined to the active electrode materials and the separator, and does not flow within the conduits. A separate coolant may be introduced to flow through the hollow tube network. In these embodiments, the walls of the hollow tubes are preferably impermeable to the electrolyte and the separate coolant.

The battery can be packaged into either prismatic format cells or cylindrical cells. In the prismatic format, the stacked structure is preferably sealed with a packaging material capable of preventing air and water contamination of the battery. In a cylindrical format, a multi-layered structure will be wound into a jelly roll. The jelly roll can be sealed in a metal container after battery electrolyte is added.

Metal-ion batteries are typically included in a battery pack, which includes a plurality of electrochemical cells that are electrically connected in series and/or in parallel. Metal-ion battery packs come in many shapes, sizes, capacities, and power ratings, depending on the intended use of the battery pack. Battery packs will typically include a number of metal-ion cells and a thermal-management system. Open space or a heat-absorbing material may be incorporated between cells, to avoid excessive heating. Or, ceramic plates may be included between each cell, for example. A vent may be added to the battery box in case of thermal runaway reactions.

Metal-ion batteries (e.g., lithium-ion batteries) according to this invention may be suitable for operating across a variety of temperature ranges. The temperature of metal-ion battery operation may vary, as is known. Exemplary operation temperatures may be from −50° C. to 80° C., such as for military applications. For computers and related devices, as well as for electric-vehicle applications, an exemplary thermal operation range is −30° C. to 60° C.

Variations of the invention offer a novel approach to improve the life performance and thermal management systems of lithium-ion batteries and other batteries. The direct benefits include improving battery energy density, enhancing battery safety, and extending battery life. These are important benefits across many commercial applications for industrial, consumer, and military uses.

While the addition of the pumping power and excess electrolyte can reduce the overall energy and power performance of a battery, this reduction is compensated for by the benefits gained from increased energy density of the battery and improved battery safety.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A metal-ion battery system comprising:
    a three-dimensional framework of conduits having electrically conductive walls;
    a first electrode region comprising a first portion of said conduits and a first active electrode material outside of said first portion of said conduits;
    a second electrode region comprising a second portion of said conduits and a second active electrode material outside of said second portion of said conduits; and
    an electrically insulating separator disposed between said first and second electrode regions,
    wherein said system contains a liquid electrolyte within said conduits.

2. The metal-ion battery system of claim 1, wherein said liquid electrolyte carries metal ions between said first and second electrode regions, and wherein said metal ions are selected from the group consisting of lithium ions, aluminum ions, sodium ions, potassium ions, magnesium ions, calcium ions, rubidium ions, and combinations thereof.

3. The metal-ion battery system of claim 2, wherein said metal ions are lithium ions.

4. The metal-ion battery system of claim 1, wherein said three-dimensional framework includes one or more metals, one or more conductive polymers, carbon, or a combination thereof.

5. The metal-ion battery system of claim 1, wherein said separator is a porous membrane that is permeable to said metal ions.

6. The metal-ion battery system of claim 1, wherein said separator is a solid-electrolyte separator.

7. A lithium-ion battery system with electrolyte flow, said system comprising:
    (a) a positive electrode comprising a lithium-containing active positive-electrode material and a first conductive network with hollow liquid-transport conduits;
    (b) a negative electrode comprising a lithium-containing active negative-electrode material and a second conductive network with hollow liquid-transport conduits;
    (c) a separator that electronically isolates said positive and negative electrodes;
    (d) a liquid electrolyte contained within said hollow liquid-transport conduits of said first and second conductive networks,
    wherein walls of said hollow liquid-transport conduits are positive-electrode and negative-electrode current collectors within said first and second conductive networks, respectively.

8. The lithium-ion battery system of claim 7, wherein said first conductive network comprises an ordered micro-lattice metallic structure containing said hollow liquid-transport conduits as structural members.

9. The lithium-ion battery system of claim 7, wherein said second conductive network comprises an ordered micro-lattice metallic structure containing said hollow liquid-transport conduits as structural members.

10. The lithium-ion battery system of claim 7, wherein either or both of said first and second conductive networks comprise an micro-lattice structure containing said hollow liquid-transport conduits as structural members, and wherein said macro-lattice structure comprises a cellular material formed of hollow tubes having a pore size from about 10 microns to about 1000 microns.

11. The lithium-ion battery system of claim 10, wherein said hollow tubes have an average wall thickness from about 0.1 microns to about 10 microns.

12. The lithium-ion battery system of claim 10, wherein said hollow tubes are formed from an electronically conductive material.

13. The lithium-ion battery system of claim 12, wherein said electronically conductive material is selected from the group consisting of Al, Cu, Ni, C, Ti, Au, Pt, carbon, electrically conductive polymers, and combinations or alloys thereof.

14. A structural battery comprising the lithium-ion battery system of claim 7, wherein said first and second conductive networks each comprise an ordered micro-lattice metallic structure containing said hollow liquid-transport conduits as structural members of said structural battery.

15. The lithium-ion battery system of claim 7, wherein in said first conductive network, said walls of said hollow liquid-transport conduits are permeable to said liquid electrolyte.

16. The lithium-ion battery system of claim 7, wherein in said second conductive network, said walls of said hollow liquid-transport conduits are permeable to said liquid electrolyte.

17. The lithium-ion battery system of claim 7, said system further comprising a housing that encloses said positive electrode, said negative electrode, and said separator, wherein said housing is configured with one or more electrolyte inlets and/or outlets for feeding said liquid electrolyte to, or purging said liquid electrolyte from, said system.

18. The lithium-ion battery system of claim 7, said system further comprising a pump configured to circulate said liquid electrolyte through said hollow liquid-transport conduits in said first conductive network and/or in said second conductive network.

19. The lithium-ion battery system of claim 18, said system further comprising a filtration unit to filter said liquid electrolyte.

20. The lithium-ion battery system of claim 7, said system further comprising a heat exchanger configured to heat or cool said liquid electrolyte.

21. The lithium-ion battery system of claim 7, wherein said separator is a solid electrolyte layer that is impermeable to said liquid electrolyte.

22. A lithium-ion battery system with coolant flow, said system comprising:
    (a) a positive electrode comprising a lithium-containing active positive-electrode material and a first conductive network with hollow liquid-transport conduits;
    (b) a negative electrode comprising a lithium-containing active negative-electrode material and a second conductive network with hollow liquid-transport conduits;

(c) a separator that electronically isolates said positive and negative electrodes;

(d) a liquid electrolyte contained within said first and second conductive networks, outside of said hollow liquid-transport conduits; and (e) a coolant contained within said hollow liquid-transport conduits of said first and second conductive networks, wherein walls of said hollow liquid-transport conduits are impermeable to said liquid electrolyte and to said coolant.

23. The lithium-ion battery system of claim 22, wherein walls of said hollow liquid-transport conduits are positive-electrode and negative-electrode current collectors within said first and second conductive networks, respectively.

24. The lithium-ion battery system of claim 22, wherein said first conductive network and/or second conductive network comprises an ordered micro-lattice metallic structure containing said hollow liquid-transport conduits as structural members.

25. The lithium-ion battery system of claim 22, wherein either or both of said first and second conductive networks comprise an micro-lattice structure containing said hollow liquid-transport conduits as structural members, and wherein said macro-lattice structure comprises a cellular material formed of hollow tubes having a pore size from about 10 microns to about 1000 microns.

26. The lithium-ion battery system of claim 25, wherein said hollow tubes have an average wall thickness from about 0.1 microns to about 10 microns.

27. The lithium-ion battery system of claim 22, wherein said hollow tubes are formed from an electronically conductive material.

28. The lithium-ion battery system of claim 27, wherein said electronically conductive material is selected from the group consisting of Al, Cu, Ni, C, Ti, Au, Pt, carbon, electrically conductive polymers, and combinations or alloys thereof.

* * * * *